Sept. 8, 1964   W. G. HARRISON ETAL   3,147,845
SORTATION MEANS

Filed Jan. 10, 1961   3 Sheets-Sheet 2

INVENTORS
Walter G. Harrison
John Harrison
BY
Ooms, Mc Dougall, Williams & Hersh.
Attys.

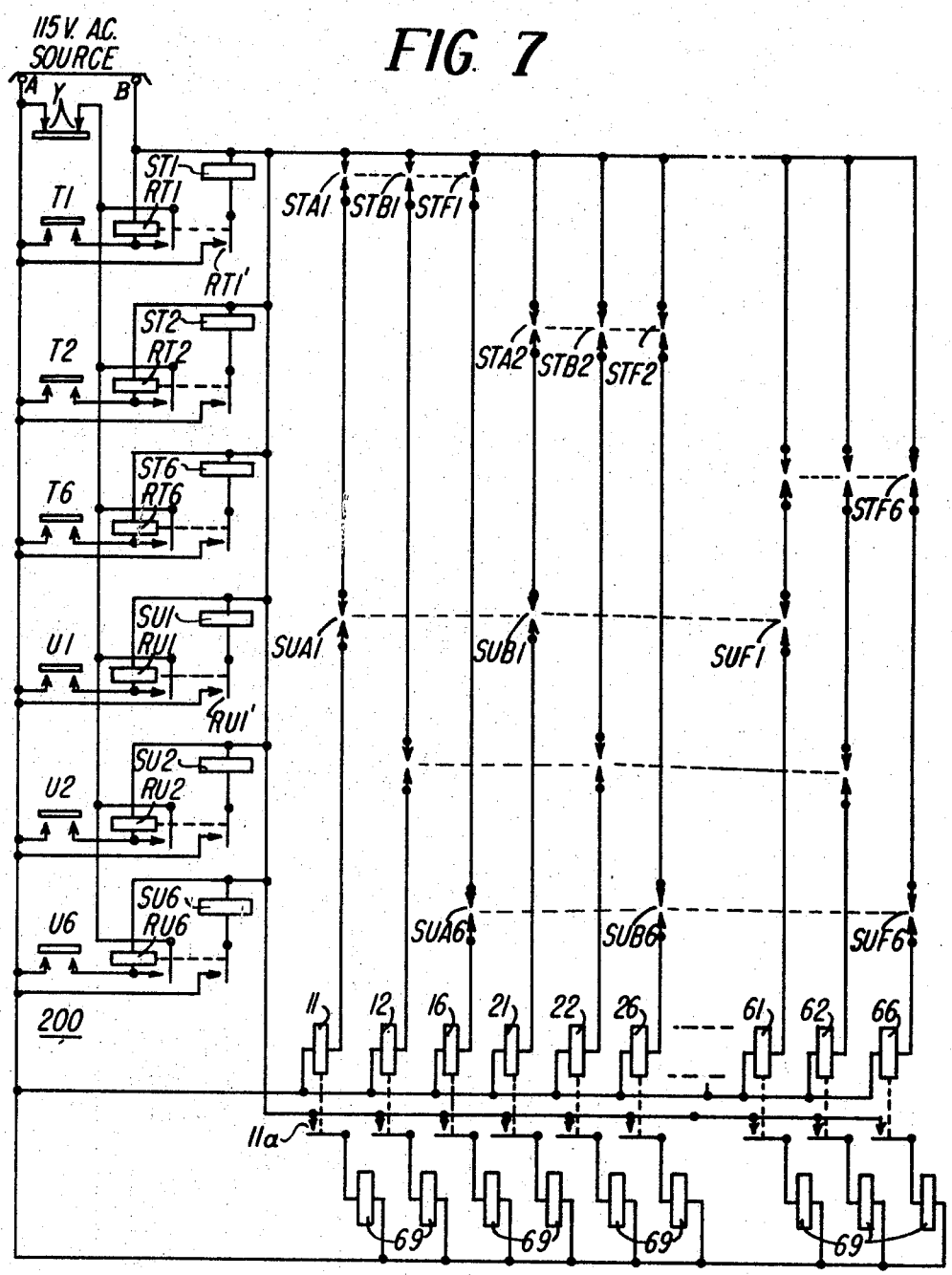

United States Patent Office 3,147,845
Patented Sept. 8, 1964

---

3,147,845
SORTATION MEANS
Walter G. Harrison, Westchester, and John Harrison, Lincolnwood, Ill., assignors, by mesne assignments, to Prospect Manufacturing Co., Inc., Chicago, Ill., a corporation of Illinois
Filed Jan. 10, 1961, Ser. No. 81,755
2 Claims. (Cl. 198—38)

This invention relates in general to conveying apparatus and more particularly to a system for selectively depositing conveyed items of vastly differing size along a conveyor route.

The provision of an economical versatile conveying arrangement for use in, for example, package sortation whereby packages of different size are selectively delivered to respective stations or locations to which may be assigned respective postal zones, contemplates that the articles may be assigned respective postal zones, contemplates that the articles may be deposited from the conveyor at respective stations without the necessity of providing correspondingly sized containers on the conveyor.

This considerably reduces the variety in the container size required to accommodate vastly different sized packages and in turn provides corresponding economies while permitting the varied sized packages to be deposited at the respective stations.

In order to do this the present invention provides identical slats which serve as the conveyor bed for conveying various articles or packages and an arrangement for selectively and successively pivoting as many slats as necessary to deposite a package at the respective location or station in the conveyor route. This therefore avoids the problem in conveying different size packages while permitting their deposit at the required station.

In addition the present invention provides electrical apparatus common to a number of different locations or stations along the route whereby operation of the electrical apparatus in various combinations selects one station among the many and controls the number of slats that are tilted or pivoted for a particular station and package consigned thereto.

It is therefore an object of the present invention to provide an improved conveying system for use in sorting conveyed articles.

It is another object of this invention to provide improved conveyor apparatus comprising a plurality of slats or trays which can be successively pivoted to deposit a package carried thereby at a selected station while in movement.

It is still another object of the present invention to provide an improved arrangement for electrically selecting the number of slats to be pivoted for depositing a package supported thereby.

It is another object of this invention to provide a conveyor arrangement in which different sized articles may be supported by a number of support elements or slats of similar dimension which can be selectively operated for depositing a conveyed article whereby a standard sized support element or slat may be used in the conveyor irrespective of article size.

Other objects and features of this invention will become apparent on further examination of the following specification, claims and drawings.

FIG. 7 illustrates one type of circuit arrangement by means of which the respective stations are selected and the number of slats to be pivoted is determined.

Figure 1:
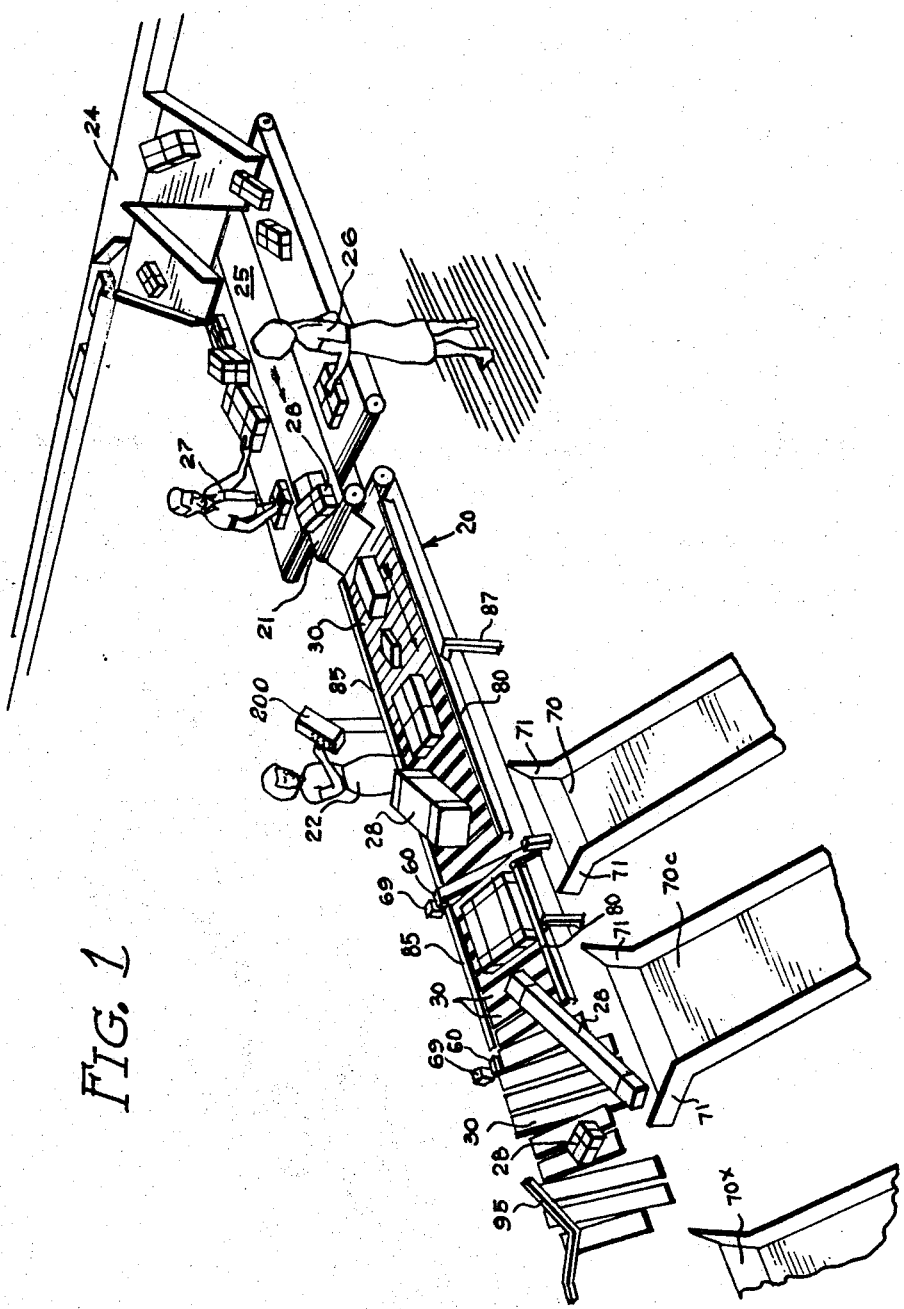
FIG. 1 is a schematic plan view showing the general arrangement of the conveying apparatus.

Referring now to FIG. 1 it will be seen that the sortation apparatus or conveyor system is generally indicated at 20. It comprises an endless chain which carries a series of slats 30 past a number of different stations in the direction indicated by the arrow. The slots 30 are appropriately supported and guided by the guide channels 80 and 85 as will be explained and are successively aligned with a feeding station 21. A belt 25 brings the incoming packages such as 28 of various sizes towards the feeding station 21. Attendants at 26 and 27 conventionally mark the packages in accordance with the respective destinations as they come off the main conveyor 24 to the two feed belts 23 and then move each package onto the belt 25 and that belt conveys the packages to the feeding station 21 whereupon they drop onto the slats 30. It will be noted that the packages 28 are of considerable variance in size and that they therefore lay across differing numbers of the slats 20. The packages are now conveyed past the attendant 22 to the respective stations.

The stations are indicated at 70–70x and are disposed as desired along the route of the conveying apparatus 20. The stations 70–70x are arranged in successive position and each is provided with guide flanges 71 which serve to direct deposited packages. In this arrangement the stations 70–70x may represent various postal zones in respective groups with each being assigned one of a pair of digits from 11–16, 21–26, 31–36, 41–46, 51–56 and 61–66 and/or other numbers.

The attendant at 22 operates a tens and a units key T1–T6 and U1–U6 as seen in FIG. 7 at the keyboard 200 corresponding to the respective digits representing a postal zone corresponding to one of the stations 70–70x at which the package is to be deposited. The operated keys prepare a pair of memory times one individual to the tens digit and one individual to the units digit and of any well-known type that are stepped once each time the slats are moved one increment or step respectively.

Each memory timer, for example, may comprise the well-known type of construction wherein one of a series of balls may be successively dropped into a channel responsive to the operation of a solenoid under control of a respective tens or units key. These balls may each be stepped through about 90 positions in the channel by a suitable lever operated on each step or incremental movement of the chain. As long as the ball solenoid associated with a particular memory timer remains operated, a ball will be dropped into the channel responsive to each incremental advance of the conveyor chain so that the number of balls in the channel can correspond to a particular number of slats. Contacts may be placed at one or more selected positions adjacent the channel for operation by the respective balls when passing through those positions. Any ball in the channel is stepped preferably by arms positioned on the chain at locations corresponding to the respective slats responsive to each increment moved by the chain and slats. This brings each ball in a channel past a predetermined position corresponding to the desired station assigned to the memory timer. Contacts at that predetermined position are then closed for preparing a respective circuit to a solenoid at the desired station.

This circuit is completed responsive to the prepared tens and units timer at which respective balls are each stepped to a position corresponding to the desired station. The completed circuit operates the solenoid 69 individual to the station. Thereafter the ball at each timer is returned to its original condition. Thus each different tens digit is assigned to an individual timer and each different units digit is assigned an individual timer and by arranging the respective outputs in a matrix so that when the ball at the tens timer is stepped past positions corresponding to its tens digit and the units timer is stepped past corresponding positions, the conveyor will have moved the slats 30 upon which the package 28 is loaded to the desired one of the stations 70–70x at which that package is to be deposited. It will also be understood that alternatively one memory timer may be assigned to each station and when prepared responsive to the operation of a button at keyboard 200 it will sequentially count each conveyor step until the carriage upon which the package is deposited is abreast of the station and then operate the solenoid 69 to cause the deposit of the package at the station. This latter arrangement is well known.

The conveyor 20 is also provided with a motor (not shown) which steps the chain 90 and the slats 30 through a caterpillar drive. The chain 90 or the carriages 30 are adapted to operate in any well known manner an arm (not shown) associated with each memory timer for stepping any ball in the aforementioned channel one step for each increment moved. Thus the slats 30 are connected to the chain 90 in fixed positions and each time the chain 90 moves a desired step or segment the selected memory timers are operated to move a ball one step and when the ball has moved through a number of steps corresponding to various stations or locations assigned a memory timer, contacts at each of those positions are operated.

When the selected pair of memory timers have been operated to place a ball in the associated channel and those balls are each stepped to a position corresponding to the desired station, the balls will each operate a contact. The contacts are arranged in the aforementioned matrix so that when both the tens and units contacts corresponding to one station are operated, a circuit is completed to a respective solenoid 69 seen in FIGURE 7 and individual to the station at which the package is to be deposited. The first slat 30 upon which the package 28 is loaded is then opposite that station.

The solenoid 69 retracts the respective latching bar 60 to permit the slat 30 to pivot in the direction of the selected station under influence of the respective biasing spring 43 to deposit the package 28 in the receptacle provided at the respective station. The number of balls dropped into each channel is dependent on the number of incremental advances of the chain 90, while the ball solenoid associated with the memory timer is operated. The attendant noting that the end of the package loaded on any group of slats has passed her position, operates the key Y to release any operated ball solenoid. Thus the number of balls in the timer channels correspond to the number of slats carrying the packages and as each ball passes the contacts which operate solenoid 69 at the desired station they will maintain solenoid 69 operated until the last slat carrying the package has pivoted. As no further balls are then in position to maintain the timer contacts operated, the solenoid 69 restores. This positions the latching bar 60 for engaging succeeding slats to prevent those slats from pivoting. These succeeding slats may therefore carry a package to a succeeding station. As the slats 30 proceed around the conveyor, they successively encounter the restoring guide 95 which restores each slat 30 to its normal or horizontal position. It is then engaged by appropriate channels 80 and 85 in preparation for the receipt of another package. The channels or guides 80 and 85 are indicated in FIGURE 2 only for the upper side edge of the slats 30 of conveyor 20; however, the same may be provided both along the underside and terminals of the conveyor 20.

Figure 2:
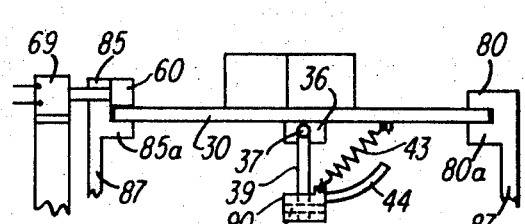
FIGS. 2 and 3 are front and side elevational views of a portion of the conveyor apparatus shown in FIG. 1.
Figure 4:
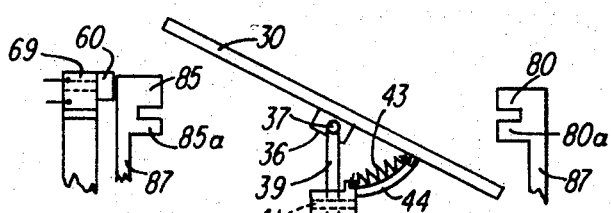
FIG. 4 is a front elevational view of the conveying apparatus in FIG. 1 taken to illustrate the manner in which one of the slats is pivoted to deposit a package.
Figure 3:
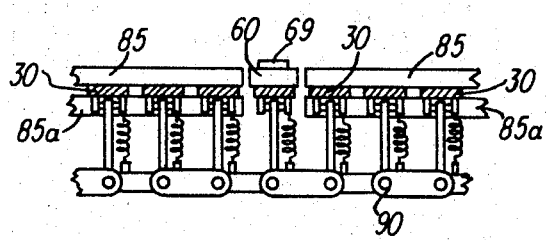

Referring now to FIGS. 2, 3 and 4, it will be seen that each slat 30 has on its underside a yoke 36 which is pivotally supported on pin 37. The pin 37 is mounted on the chain 90 by the standard 39, which in turn is carried by the chain 90 so that the slats are moved around the conveyor. A fastening pin 41 connects the standard 39 to the chain 90. The standard 39 and slat 30 are arranged to move around the terminals of the conveyor 20 at which the chain drive sprockets may be located. A biasing spring 43 is provided for pivoting slats 30 about the pin 37; however, the guide channels 80 and 85 normally prevents this. A stop 44 limits the degree of pivoting of the slat 30.

The channels or guides 80 and 85 are supported by the vertical standards 87 and each has a lower leg 80a and 85a respectively for holding respective edges of the slats 30 as they move. The guides or channels 80, 85, etc. are terminated adjacent respective stations and only the latching bar 60 controlled by the respective solenoid 69 prevents the slats from pivoting. Thus when the respective slats come abreast the selected stations the retraction of the respective latching bar 60 enables the slat to pivot under control of the spring 43.

Figure 5:
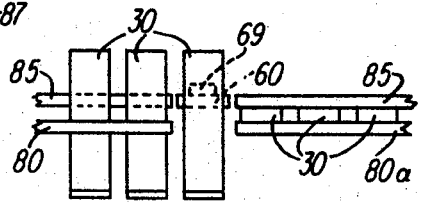
FIG. 5 illustrates the manner in which the slats are moved between the guide rails after being pivoted.

Now as the first slat carrying a package to be deposited comes adjacent the location at which the package is to be deposited, the solenoid 69 corresponding to that station is energized. It retracts the latching bar 60, and the first slat 30 pivots under influence of the spring 43. If the package 28 is long it will be lying across a number of such slats 30. The first slat continues to move in its pivoted position and disengages from the guides 80, 80a, 85 and 85a as seen in FIG. 5, and the second slat comes abreast of latching bar 60. As latching bar 60 is still retracted, the second slat 30 also pivots and is disengaged from the guides 80, 80a, 85 and 85a. It continues in its passage while the succeeding slat is pivoted. As the number of pivoted slats increase the package is tipped and is then deposited at the station. If the package is longer than the station, the pivoting of the first several slats tip the package sufficiently for it to engage the flange 71 whereupon it is held until a sufficient number of slats are pivoted to deposit the package.

Figure 6:
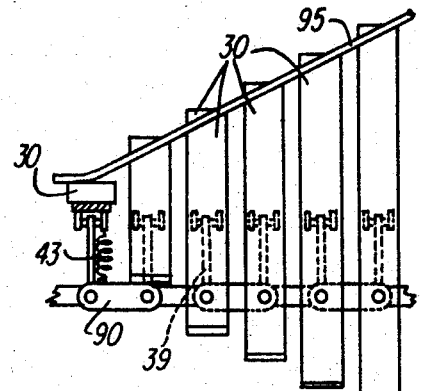
FIG. 6 illustrates the manner in which the slats are returned to normal.

The restoring guide 95 is located at a desired location along the conveyor for the purpose of restoring the slats 30 to their unoperated condition. Thus as seen in FIGS. 1 and 6, it comprises an inclined bar located just to one side of the center of the conveyor and terminating in a plane parallel to the horizontal and just above the level of the horizontal slats 30 and angling to the edge of the slats whereafter it parallels the edge from which it is supported by means not shown. As a pivoted slat 30 is moved into engagement with bar 95 it pivots counterclockwise against the tension of spring 43. As the slat comes into a horizontal position it is held there by the horizontal portion of bar 95 whereafter the guide 80 and 85 may now engage the slats to hold them horizontal.

Referring now to FIG. 7, there will be seen the electrical circuitry whereby respective ones of the solenoids 69 are energized at different stations under control of the keyboard at 200. The power is supplied from a conventional 115 volt source whose opposite terminals are indicated at A and B. The keyboard 200 comprises a series of keys T1–T6 corresponding to different tens digits and U1–U6 corresponding to the various units digits. These keys are momentarily operated by the attendant at 22 in accordance with the desired destination of a package being transported along the conveyor system to render effective corresponding memory timers. Thus, for example, keys T1 and U1 are operated if the station to which the package is destined corresponds to 11 increments on the conveyor system and each operates a corresponding relay RT1 and RU1 which operate the respective memory timer solenoids ST1 and SU1 at contacts such as RT1' and RU1'.

Relays RT1–RT6 and RU1–RU6 on operation each complete a respective holding circuit through the push button contacts y. These push button contacts y are at the keyboard 200 and are operable to release the relays at the option of the attendant to restore any operated relay RT1–RT6 and RU1–RU6 and the respective memory timer solenoids ST1–ST6 and SU1–SU6.

Thus relays RU1–RU6 and RT1–RT6 each enable the respective ball solenoid SU1–SU6 and ST1–ST6 associated with its memory timer to control the deposit of the balls in the respective channels in synchronism with the movement of the slats. The relays RT1 and RU1 are operated therefore responsive to the proper operation of the respective tens and units keys and these relays lock operated at their respective L contacts. The relays RT1 and RU1 also energize the respective solenoids SU1 and ST1 and a ball at each timer now drops into the respective channel. These balls may now be stepped by the conveyor in synchronism with the position with the first slat upon which the package is deposited. As each step is thereafter taken by the chain, the lever arm at each timer controlled thereby advances any ball in its channel. This therefore permits another ball to drop into the channel at the timers associated with solenoids ST1 and SU1. Thus with each slat advance another ball drops into the channel at each of those memory timers. The operator noting that the package is fully deposited across the slats and that the last slat upon which it is carried is passing her, operates button y. This releases the relays RT1 and RU1 and the solenoids ST1 and SU1 to prevent the deposit of other balls.

As the conveyor moves the slats 30 along the route, the conveyor now steps the first and other deposited balls successively once along the track or channel for each incremental advance of the conveyor. As the first ball in the channel associated with the timer RT1 passes its 11th–16th position it closes a respective one of contacts STA1–STF1 in each of those positions. As the ball in the units timer is stepped past positions 11, 21, 31, 41, 51 and 61, for example, it will close contacts SUA1–SUF1 respectively. Thus when the first ball in each selected timer has been stepped to a position corresponding to eleven increments a circuit is completed through contacts STA1 and SUA1 for operating the tray relay 11 and individual to its desired station. Relay 11 operates the solenoid 69 at the station at contacts 11a so that the first slat 30 upon which the package is carried and which is now opposite that station tilts responsive to the retraction of the stop. Then the first ball in each channel is stepped past the contacts STA1 and SUA1, but as the next ball in each channel and corresponding to the second slat are now positioned for maintaining the respective contacts STA1 and SUA1 operated, the solenoid 69 maintains the stop retracted so that the second slat tilts. In this manner the solenoid 69 is maintained operated by each successive ball in the channel so that the number of slats pivoted correspond to the number of balls in the channel and therefore the number of slats used for conveying the package. The memory timer contacts are adjustable with respect to ball channels, of course, so that the timers are interchangeable and also may be adjustably related to the station locations. The tray relay 11 is, of course, released as soon as the conveyor steps the last deposited ball in each channel to position 12 to in turn release the solenoid 69.

Assuming, therefore, that a package 28 deposited on slats 30 is intended for postal zone 26 corresponding to station 70C. The operator at 27 operates a tens digit key T2 and a units digit key U6 to activate relays RT1 and RU6 respectively. Each locks operated and also operates the ball solenoids ST2 and SU6 which each now deposit a respective ball in the associated track or channel. The tens and units memory timer balls are thereafter stepped once responsive to each step of the conveyor and a ball deposited for each step of the conveyor until the operator operates key y to release relays RT2 and RU6 and the associated timer solenoids ST2 and SU6. The operator in the meantime operates button y to release relays RT2 and RU6 and solenoids ST2 and SU6 to limit the number of balls in each channel in accordance with the number of slats carrying the package.

When the first tens memory timer ball passes the position corresponding to 26 increments of the conveyor, it closes contacts STF2. The ball may previously close contacts STA2–STE2, but this will have no effect as circuits to the tray relays will not be completed thereby unless a units ball is simultaneously closing a contact. The first units memory timer ball simultaneously closes contacts SUB2 in its 26th position. When this occurs a circuit is completed through a tray trip relay 26 and that relay completes a circuit to the solenoid 69 at station 70C. Solenoid 69 retracts the stop at that station and the spring 43 pivots the first slat 30 which has now taken a corresponding number of steps and is abreast of the location 70C corresponding to the postal zone 26. As the balls in each of the channels pass the respective contacts STF2 and SUB6, the solenoid 69 is maintained operated until the last ball passes the contacts STF2 and SUB6. Those contacts then restore to release relay 26 and the associated solenoid 69 to prevent the pivoting of other slats.

If in the meantime another package is placed on one or more slats for deposit at station 66, for example, and corresponding buttons operated, the solenoids ST6 and SU6 are operated. Solenoid ST6 now deposits its first series of balls into the respective channel, while SU6 drops a second series of balls into the channel. When these balls are stepped to their 66th positions, contacts STF6 and SUF6 close for operating the respective try solenoid 69. The first series of balls in the channel of the memory timer associated with solenoid SU6 will also operate contact SUF6 but as contacts STF6 are not operated at that time, the tray relay 66 and associated solenoid 69 are not operated at that time. Thus packages may be selectively deposited as desired at the respective stations.

Thereafter the pivoted slats 30 are engaged by bar 96 and returned to their normal position. Each is therefore prepared to receive another package.

There has been described one embodiment of a conveyor arrangement which permits facile handling of packages or articles of considerable size variance for deposit at various stations together with electrical and other means for controlling the apparatus. However, the breadth of the invention is believed more accurately described in the following claims.

We claim:

1. In a sortation system wherein respective packages are deposited on a respective number of slats dependent on the size of said packages for transportation in one direction to any one of a plurality of stations, the improvement comprising a carriage for each slat fixedly connected at a predetermined position on a conveyor, guide channels located along predetermined portions of the conveyor route and supporting successive ones of said slats in a predetermined position, a pivotal connection between said carriage and its respective slat, biasing means for pivoting each slat whereby each slat may be pivoted in a desired direction, a latching bar located at other positions of said conveyor route and adjacent respective stations, means associated with each station and energized responsive to the selection of the respective latch bar to permit said slats to succesisvely pivot for depositing a package carried thereby at the respective station, each of the slats which are so pivoted by said biasing means being retained together in a pivoted state for discharge of said package.

2. In a sortation system wherein articles of widely varying sizes are to be discharged at any of a plurality of different stations associated with said system, the improvement comprising a plurality of slat members arranged in parallel relationship, each of said members defining an upper, article carrying surface, means including stationary guide channels interconnecting said members whereby the combined members define a substantially continuous conveyor surface, said members being dimensioned whereby substantially all of the articles carried in said system are disposed on at least two of said members, means for moving said members in succession past said stations, openings defined in said guide channels adjacent each of said stations, means providing an independent pivotal mounting for each of said members, means associated with each of said stations for causing pivoting of groups of said members, and means for selectively operating said last mentioned means for causing pivoting of groups of said members, said groups of members being adapted to be retained together in a pivoted state whereby articles carried by said groups can be discharged.

References Cited in the file of this patent

UNITED STATES PATENTS

| | | |
|---|---|---|
| 1,528,227 | Spooner | Mar. 3, 1925 |
| 1,891,003 | McFarlin | Dec. 13, 1932 |
| 2,122,542 | Stebler | July 5, 1938 |
| 2,344,596 | Carmina | Mar. 21, 1944 |
| 2,666,535 | Dooley | Jan. 19, 1954 |
| 2,868,394 | Greller et al. | Jan. 13, 1959 |
| 3,000,518 | Baumann | Sept. 19, 1961 |
| 3,034,638 | Franz | May 15, 1962 |
| 3,034,665 | Speaker | May 15, 1962 |

FOREIGN PATENTS

| | | |
|---|---|---|
| 1,060,358 | France | Nov. 18, 1953 |

OTHER REFERENCES

"How To Get Packages Off Conveyors," by Greller, article from pages 97–100 of "Modern Materials Handling" magazine, April 1960 issue.